(12) United States Patent
Musikka

(10) Patent No.: US 6,954,441 B2
(45) Date of Patent: Oct. 11, 2005

(54) IP-BASED GSM AND UMTS SYSTEM

(75) Inventor: Niilo Musikka, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 896 days.

(21) Appl. No.: 09/904,324

(22) Filed: Jul. 12, 2001

(65) Prior Publication Data

US 2003/0012154 A1 Jan. 16, 2003

(51) Int. Cl.$^7$ ................................................ H04Q 7/00
(52) U.S. Cl. ..................................... 370/328; 370/338
(58) Field of Search .............................. 370/328, 338, 370/331, 401; 455/436, 437, 445, 410, 411

(56) References Cited

U.S. PATENT DOCUMENTS

| | | | |
|---|---|---|---|
| 6,363,253 B1 * | 3/2002 | Valentine et al. | 455/445 |
| 6,385,451 B1 * | 5/2002 | Kalliokulju et al. | 455/437 |
| 6,556,820 B1 * | 4/2003 | Le et al. | 455/411 |
| 6,771,964 B1 * | 8/2004 | Einola et al. | 455/437 |

FOREIGN PATENT DOCUMENTS

| | | |
|---|---|---|
| EP | 0 664 658 A2 | 7/1995 |
| EP | 0 664 658 A3 | 7/1995 |
| EP | 1 150 523 A2 | 10/2001 |
| WO | WO 99/35800 | 7/1999 |
| WO | WO 00/76249 | 12/2000 |

OTHER PUBLICATIONS

Lin, et al., "Supporting Broadband Mobile High Speed Multi-media Services Based on TDMA MAC Protocol", IEEE pp. I–992–I–997, 1999.

Wietfeld, et al., "Seamless IP-based Service Integration Across Fixed/Mobile and Corporate/Public Networks", IEEE, pp. 1930–1934, 1999.

Kellerer, et al., "IP Based Enhanced Data Casting Services Over Radio Broadcast Networks", IEEE, 1$^{st}$ European Conference on Universal Multiservice Networks, pp. 195–203, 2000.

EPO Search Report; RS 107260 US, Date of Completion, Jun. 6, 2002.

Musikka, N. et al.; "*Erricsson's IP–Based BSS and Radio Network Server*"; On—Ericsson Review, Ericsson. Stockholm, SE: vol. 77, No. 4, 2000, pp. 224–233; XP–000969930.

* cited by examiner

*Primary Examiner*—Hassan Kizou
*Assistant Examiner*—Albert T. Chou

(57) ABSTRACT

A mobile telecommunications system has an IP-based GSM system, a UMTS system, and a connection connecting both the IP-based GSM system and the UMTS system to a common IP network. The telecommunication system can be incorporated in a network having a plurality of systems all connected by the common IP network to permit compressed speech via an A-interface in each system and throughout the network. The system permits an operator to realize a significant reduction in operating costs.

13 Claims, 4 Drawing Sheets

IP-BASED GSM AND UMTS SYSTEM

BACKGROUND OF THE INVENTION

1. Field of the Invention

The present invention relates generally to the mobile telecommunications field; and, more particularly, to an IP-based mobile telecommunications network that is capable of using compressed speech throughout the network.

2. Description of the Prior Art

FIG. 1 is a block diagram illustrating a model of a GSM (Global System for Mobile Communications) telephony system. The GSM system model is generally designated by reference number 10 and includes a Radio Access Network (RAN) generally referred to as a Base Station System (BSS) 12. BSS 12 includes two types of logical nodes: a Base Transceiver Station (BTS) 14 and a Base Station Controller (BSC) 16. In order to support circuit-switched speech or data services, the BSC 16 interworks with a Mobile Switching Center (MSC) 18 via an open (non-proprietary) interface known as an A-interface (specified in GSM TS 08.08). An MSC, such as MSC 18, can serve one or more BSCs.

Each BSC in a GSM network can control a plurality (typically hundreds) of radio cells. In other words, each BSC, such as BSC 16, interworks with a plurality (hundreds) of (BTSs) via respective Abis interfaces. Each BTS, such as BTS 14, is responsible for the transmission and reception of radio signals over an air interface, Um, in one cell. Consequently, the number of cells in a GSM BSS equals the number of BTSs in that BSS. As such, the BTSs are geographically distributed to provide adequate radio coverage of a BSC area, which forms part of a GSM Public Land Mobile Network (PLMN).

Each BTS, such as BTS 14, provides the capacity to carry a plurality of connections (calls) between Mobile Stations (MSs), such as MS 22, and respective BSCs. Specifically, in GSM, each BTS is equipped with one or more Transceivers (TRXs). Each TRX (not shown) is capable of handling eight timeslots of a Time Division Multiple Access (TDMA) frame; and, in addition, each such timeslot can be assigned different combinations of logical channels.

FIG. 2 is a block diagram of an Internet Protocol (IP)-based BSS 30, which has been developed by Ericsson. A more detailed description of such an IP-based BSS is disclosed in commonly-assigned, co-pending U.S. application for patent Ser. No. 09/494,606, the entire disclosure of which is incorporated herein by reference.

Referring to FIG. 2, the IP-based BSS 30 can include three types of nodes connected to an IP network 32. A first node connected to the IP network 32 is a Radio Base Station (RBS) 34. In general, the RBS 34 implements one or more BTSs, transmits and receives calls from MSs 22 and provides IP support for the BSS 30. For example, the RBS 34 functions as an IP host and can include an IP router (not shown in FIG. 2). The IP router can be used to route payload User Datagram Protocol (UDP) datagrams to one or more Transceivers (TRXs) and also to connect a plurality of RBSs in various topologies.

A second node connected to the IP network 32 is a GateWay (GW) 36. The GW 36 can be used to terminate the A-interface, and can include a Media GW (MGW), not shown in FIG. 2 but which will be described more fully hereinafter, which functions similarly to existing Transcoder Controllers in an Ericsson implementation of the GSM model. The MGW includes a pool of Transcoder/Rate Adaptor (TRA) devices, which, when allocated, are connected to the A-interface; and, hence to the MSC 18 via the A-interface. The IP network (e.g., GSM) side of the TRAs in the MGW are connected to respective UDP ports. Preferably, the GW 36 is connected to the IP network 32 via a separate router (not shown).

A third node connected to the IP network 32 is a Radio Network Server (RN Server) 38. The RN Server 38 corresponds to the BSC used for implementing a GSM model, such as the GSM model 10 illustrated in FIG. 1. A primary difference between the RN Server 38 and a BSC is that the RN Server does not switch payloads and does not include a Group Switch (GS). As such, the RN Server 38 preferably carries signaling only, and includes a pool of processors (e.g., the number of processors determined by capacity requirements). The RN Server 38 can serve one or more logical BSCs and is preferably connected to the IP network 32 via a separate router. As such, the payload can be routed directly between the GW 36 and RBS 34, without passing through the RN Server's processors. The A-interface signaling is routed between the RN Server 38 and GW 36.

FIG. 3 schematically illustrates an exemplary mobile telecommunications network operating in accordance with GSM specifications. The network is generally designated by reference number 50, and comprises three geographical areas 52, 54 and 56, also designated in the Fig. as areas G, S and M, respectively. Each geographical area 52, 54 and 56 includes a connection 58 to a PSTN (Public Switched Telephone Network), and each area also includes a plurality of RBSs 62 to provide full radio coverage. Each RBS is connected to a BSC 64 where transcoders (not shown in the Fig.) are located. The BSCs, in turn, are connected to MSCs 66 in each area.

In the network 50 illustrated in FIG. 2, voice traffic is carried from an MS (not shown in FIG. 2) to the transcoders in a BSC 64 via an RBS 62 on 8 or 16 kbits/sec channels. From the BSC, the voice traffic is carried on 64 kbits/sec channels to the MSC 66 (via the A-interface), and further through the MSC 66 to the PSTN connection 58.

Thus, in a GSM system, compressed speech can be used only between the MS and the BSC. From the BSC to the MSC and from the MSC to the PSTN connection, voice traffic must be carried on 64 kbits/sec channels. This results in high transmission costs for the system operator.

In order to assist in understanding the present invention, an example of the operation of a GSM network such as illustrated in FIG. 3 will now be described. In the example, a scenario with an MS terminating call will be described; and in such a scenario, as described above, it is only possible to use compressed speech from the BSC to the MS. The MS terminating call is made in the following way.

A PSTN-sub in area S calls an MS-sub in area M.

The PSTN connects the call to the nearest gateway MSC ($MSC_S$).

The $MSC_S$ forwards the call to $MSC_M$.

$MSC_M$ sends a page to $BSC_M$.

$BSC_M$ sends the page to all RBSs in area M.

When the MS answers, $BSC_M$ sets up a signaling connection to $MSC_M$.

$MSC_M$ selects a CIC (Circuit Identity Code) in $MSC_M$ and sends the CIC value to $BSC_M$ in the Assignment Request.

When $BSC_M$ receives the Assignment Request, $BSC_M$ selects a TRA in $BSC_M$ and connects it to the RBS in area M.

CIC is always selected in the MSC closest to the BSC resulting in a 64 kbits/sec connection from the PSTN in area S to the BSC in area M, and compressed speech (e.g., 8 or 16 kbits/sec) from the BSC in area M to the MS.

In recent years, substantial effort has gone into development of so-called $3^{rd}$ generation mobile telecommunications systems in order to address the growing demand for wireless multimedia services. One implementation of a $3^{rd}$ generation system is known as the Universal Mobile Telephony System (UMTS); and FIG. 4 schematically illustrates a UMTS system.

The UMTS system is generally designated by reference number 70, and is configured in accordance with the $3^{rd}$ Generation Partnership Project (3GPP) technical specifications. UMTS 70 includes a Core Network 72, and a Universal Terrestrial Radio Access Network (UTRAN) 74. UTRAN 74 includes one or more Radio Network Subsystems (RNSs), such as RNSs 76a and 76b. The RNSs 76a and 76b each include an RNC (Radio Network Controller) 78a and 78b, respectively, and related Node Bs 80a, 80b and 80c, 80d, respectively.

The Core Network 72 enables subscribers to access services from a network operator. An RNS can function in a UTRAN as the access part of the UMTS network; and can allocate and release specific radio resources in order to establish connections between a UTRAN and a mobile station 82 as shown in FIG. 4. Thus, an RNS is generally responsible for the radio resources and transmission/reception in a set of cells. The RNCs in the RNSs generally function to control the use and integrity of radio resources. Each Node B is a logical node responsible for the radio transmission/reception in one or more cells and to or from an MS. A Node B is generally similar to a base station in a non-$3^{rd}$ generation system. An RNC, e.g., RNC 78b, can function as a Controlling RNC (CRNC) with respect to a specific set of Node Bs. A Node B, however, typically has only one CRNC. A CRNC generally controls the logical resources of its related Node Bs. As shown in FIG. 4, an RNC and a Node B communicate with one another via an Iub interface, RNCs communicate with one another via an Iur interface and RNCs communicate with the Core Network via an Iu interface.

One of the drivers for the function distribution for the Iu interface in a UMTS system was to make it possible to have the transcoder at the edge of a PLMN. As indicated above, however, this has not been possible with the A-interface in a GSM system.

SUMMARY OF THE INVENTION

In accordance with the present invention, it has been discovered that by providing a mobile telecommunications network that incorporates both an IP-based GSM system and a UMTS system; the flexibility of the overall network design and topology are significantly increased; and it becomes possible to use compressed speech all the way from an MS to the edge of the PLMN in such a system.

A mobile telecommunications system according to the present invention comprises an IP-based GSM system, a UMTS system, and a connection connecting both the IP-based GSM system and the UMTS system to a common IP network.

According to a presently preferred embodiment of the invention, a control plane of the MSC (in the GSM system) is terminated in an MSC server. The control plane of the RNC (in the UMTS system) and the BSC (in the GSM system) is terminated in a Radio Network Server (RN Server), and the user plane for both GSM and UMTS is implemented in a common Media Gateway (MGW). The MSC server, the RN Server, the MGW and all the RBSs are connected to the common IP network via one or more IP-routers.

Because all the elements of the combined system are connected to the common IP network, each of the elements can directly communicate with any other of the elements via the IP network. This capability enables the combined telecommunications system to be designed such that compressed speech can be used all the way from an MS to the edge of a PLMN; and, thus, can result in a significant reduction in transmission costs to a system operator.

According to an embodiment of the present invention; the mobile telecommunications system is included in a mobile telecommunications network comprising a plurality of geographical areas/sites, each of the geographical areas/sites including an IP-based GSM system and a UMTS system. The common IP network connects each of the plurality of areas/sites enabling compressed speech to be used throughout the network. For example, a call from an MS associated with any one of the sites can be made to an MS associated with any other of the sites using compressed speech throughout the entire route from one MS to the other.

With an IP-based GSM system and UMTS system according to the present invention, the interface to the MSC can be either the A-interface of the GSM system or the Iu interface of the UMTS system. The bandwidth reduction in the common IP network will be greater than 50 percent as compared to that in a GSM system, depending on the degree of IP header compression.

Yet further advantages and specific details of the present invention will become apparent hereinafter in conjunction with the following detailed description of presently preferred embodiments of the invention.

DETAILED DESCRIPTION OF PRESENTLY PREFERRED EMBODIMENTS

As indicated above, the present invention provides a mobile telecommunications system that includes both an IP-based GSM system and a UMTS system that, in general, provides an increased flexibility in network design and topology; and, in particular, makes it possible to carry compressed speech throughout the system.

The IP-based GSM and UMTS system according to the present invention takes advantage of a server-gateway split of the MSC, RNC (UMTS) and the BSC (GSM). Specifically, according to the invention, the control plane of the MSC is terminated in a MSC Server, the control plane of the RNC/BSC is terminated in an RN Server, and the user plane for both GSM and UMTS is implemented in a common Media Gateway (MGW). The MSC server, the RN Server, the MGW and all the base stations are connected to the common IP network via one or more IP-routers. As a result, any element of the system can communicate with any other element of the system via the common IP network.

With the present invention, compressed speech (e.g., 8 or 16 kbits/sec) can be carried all the way from an MS to an edge of a PLMN and the control plane interface to the MSC can be either the A-interface or the Iu interface. By using both an IP-based BSSAP (Base Station System Application Protocol) and a RANAP (Radio Access Network Application Protocol), signaling between the RN Server and the MSC server and the server-gateway architecture of the MSC, a mobile telecommunications network comprising a plurality of geographical areas can be built that takes advantage of compressed speech and Discontinuous Transmission (DTX) throughout the entire IP network. MS-to-MS calls in the network can also be directly connected without transcoders (see U.S. patent application Ser. No. 09/738,067).

Figure 5:
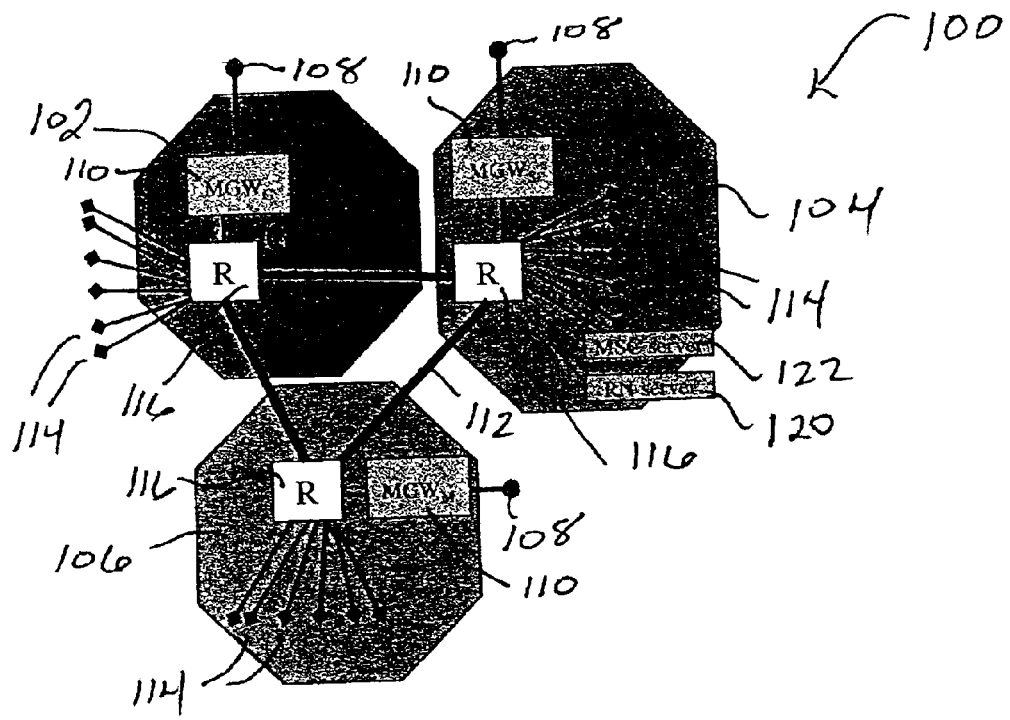
FIG. 5 is a block diagram illustrating an exemplary mobile telecommunications network incorporating both an IP-based GSM system and a UMTS system according to an embodiment of the present invention.

FIG. 5 illustrates an IP-based GSM and UMTS system according to a presently preferred embodiment of the invention. In particular, FIG. 5 illustrates an operator network 100 that has three areas (switch sites), 102, 104 and 106, also designated as G, S and M, respectively. At each of the three switch sites, the operator has a connection 108 to the PSTN. An MGW (Media Gateway) 110, which will be described more fully hereinafter, is located at each of the sites, and an IP backbone 112 connects all the sites. Each of the RBSs 114 are connected to the same IP network 112, either through an IP-router 116 (also designated as R in FIG. 5), at each of the switch sites as shown in the Fig., or through routers at hub sites (not shown). In addition, the RN Server 120 and the MSC server 122 are connected to the IP network through the IP-router 116 as shown. All network elements have connectivity with each other via the common IP network.

No changes are proposed to the BSSAP and RANAP signaling. In the A-interface case, the RN Server 120 translates the Circuit Identity Code in the Assignment Request to a reference inside the MGW. In the Iu interface case, the RN Server translates the Iu interface Transport Layer Address (Iu Transport Layer Address to internal MGW address). In UMTS, where soft handover is more common; soft handover combining devices are located in the MGW. For a particular call, the soft handover combining devices closest to the base station are used.

Figure 6:
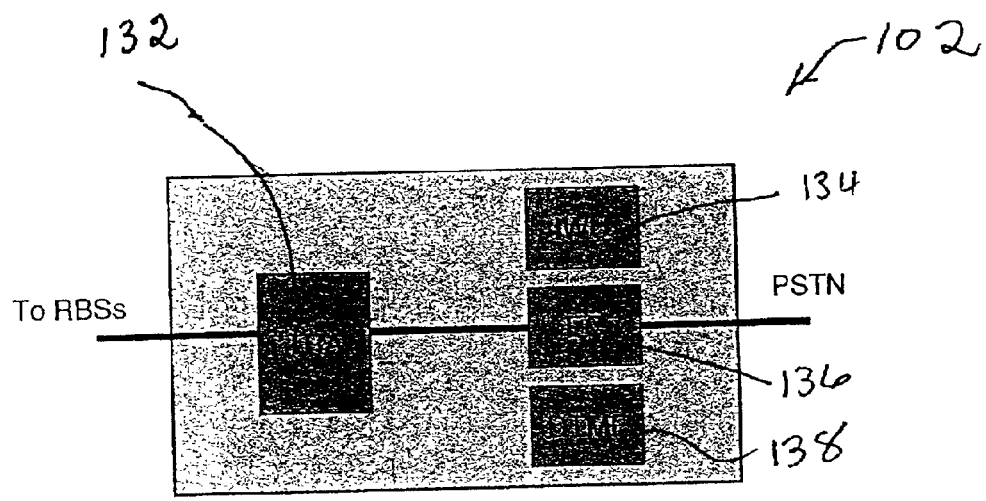
FIG. 6 is a block diagram illustrating an implementation of an MGW of FIG. 5 according to a further embodiment of the invention.

FIG. 6 illustrates one implementation of the MGW 102 of FIG. 5 according to an embodiment of the present invention. As shown, MGW 102 comprises a separate component that includes transcoders (TRAs) 132, an Interworking Unit (IWU) 134, echo chancellors (EC) 136 and the DTMF senders (DTMF) 138. In an alternative embodiment, the MGW can be incorporated in the BSS and the MSC and comprise a BSS part with the transcoders and a MSC part with the echo chancellors, the Interworking Unit and the DTMF senders. If a standardized A-interface must be present, the MGW is implemented in two separate network elements with the A-interface in between. For the UMTS case, the transcoders in the MGW can also be used.

Figure 1:
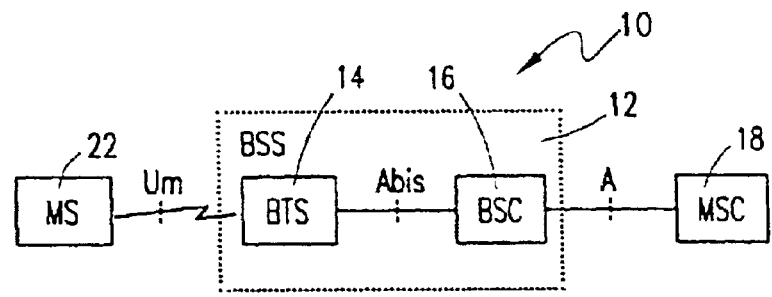
FIG. 1 is a block diagram illustrating a GSM mobile telephony system.
Figure 2:
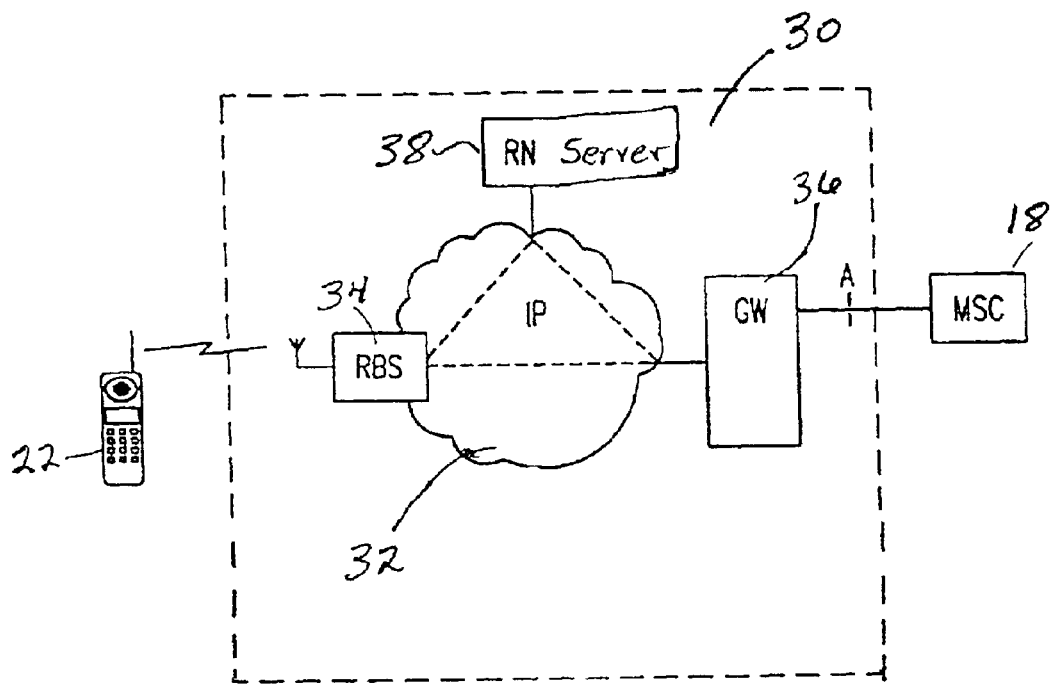
FIG. 2 is a block diagram illustrating an IP-based GSM telephony system.
Figure 3:
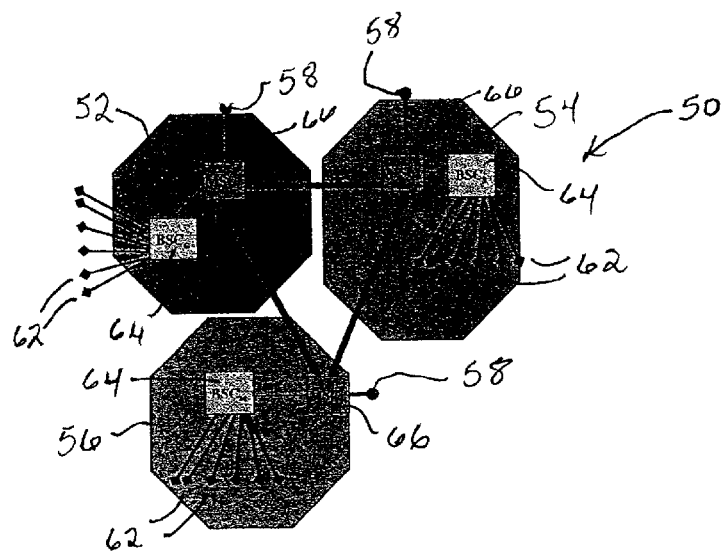
FIG. 3 is a block diagram illustrating an exemplary mobile telecommunications network operating in accordance with GSM specifications.
Figure 4:
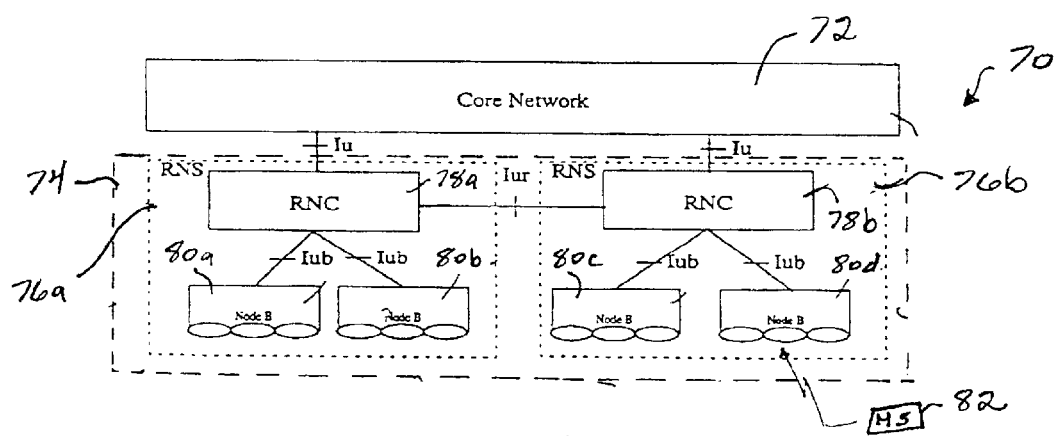
FIG. 4 is a block diagram illustrating a UMTS mobile telephony system.

An example of the operation of an IP-based GSM and UMTS network as illustrated in FIG. 5 will now be described. In particular, a scenario for a GSM MS terminating call will be described with reference to FIG. 5:

A PSTN-sub in area S calls an MS-sub in area M (note, that this is the same type of call as in the scenario described with reference to the network of FIG. 3).

The PSTN connects the call to the nearest GMSC ($MGW_S$).

$MGW_S$ forwards the call to the MSC server.

The MSC server sends a page to the RN Server, indicating the LA (Local Area) in area M.

The RN Server sends the page to all RBSs in area M.

When the MS answers, the RN Server sets up a signaling connection to the MSC server.

The MSC server selects a CIC in $MGW_S$ and sends the CIC value to the RN Server in the Assignment Request.

When the RN Server receives the Assignment Request, the RN Server selects a TRA in the $MGW_S$ and connects it to the RBS in area M.

The CIC is always selected as close to the PSTN POP as possible resulting in compressed speech (e. g., 16 kbits/sec) from the MGWs to the MS.

With reference still to FIG. 5, a scenario for a GSM MS originating call will now be described.

An MS-sub in area S calls a PSTN-sub in area M.

The MS makes an access to the RBS in area S by sending a Channel Request.

The Rn Server sets up a signaling connection between the MS in area S and the MSC server.

The MSC server recognizes that the call is for a PSTN-sub in area M.

The MSC server selects a CIC in $MGW_M$ and sends the CIC value to the RN Server in the Assignment Request.

When the RN Server receives the Assignment Request, the RN Server selects a TRA in the $MGW_M$ and connects it to the RBS in area S.

Again, CIC is always selected as close to the PSTN POP as possible resulting in compressed speech (16 kbits/sec) from the $MGW_M$ to the MS.

Figure 7:
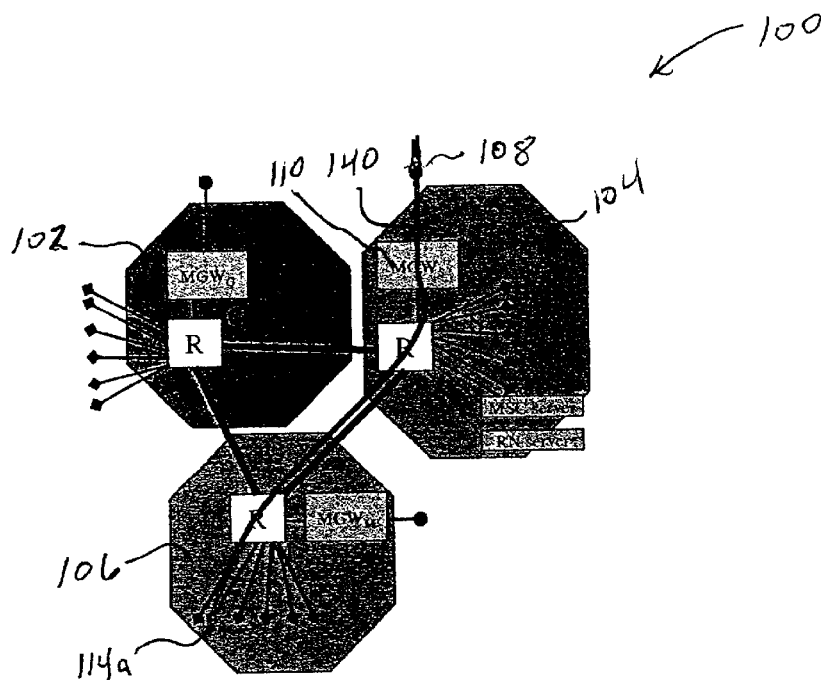
FIG. 7 is a block diagram illustrating a voice path in the mobile telecommunications network of FIG. 5 according to an embodiment of the invention.
Figure 8:
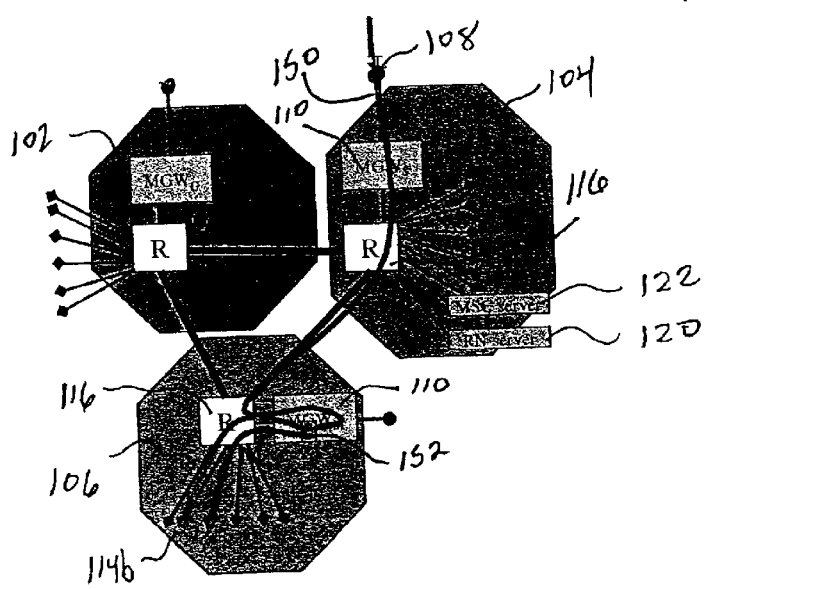
FIG. 8 is a block diagram illustrating a further voice path in the mobile telecommunications network of FIG. 5 according to another embodiment of the invention.

FIG. 7 illustrates the voice path 140 in the IP-based GSM and UMTS system of FIG. 5 for a call between a GSM MS 114a in area 106 (area M) and a fixed subscriber in area 104 (area S) via the PSTN connection 108, and FIG. 8 shows the voice path 150 for a call between a UMTS MS 114b in area 106 (area M) and a fixed subscriber in area 104 (area S) via PSTN 108. Note the use of the soft handover combining device 152 in the $MGW_M$ 110, which is closest to the base station.

With the present invention, problems associated with high operator transmission costs are reduced significantly by using an IP-based GSM and UMTS system which makes it possible to use compressed speech all the way from an MS to the edge of the PLMN and throughout a telecommunications network. The bandwidth reduction in the backbone is greater than 50% as compared with known GSM systems, depending on the degree of IP header compression. The transcoder pools can be made common between GSM and UMTS.

Among the advantages of locating the servers at a few sites include:

Operation and maintenance handling, e.g., function upgrades, is simplified.

Server gateway split gives scalability both on the server side and on the gateway side and RBSs no longer need to be hard-wired to the BSCs.

Strict heirarchy can be eliminated, all RN Servers can communicate with all MGWs and calls from any RBS can be connected to any MGW.

Resources, such as transcoders, can be managed as a pool.

Load balancing can be achieved between the processors in the RN Servers and it gives the possibility of having RN Servers acting as standby, i.e., each RN Server could take the load off of another RN Server. In this way, automatic recovery from node failure can be accomplished.

It should be emphasized that the term "comprises/comprising" when used in this specification is taken to specify the presence of stated features, integers, steps or components but does not preclude the presence or addition of one or more other features, integers, steps components or groups thereof.

While what has been described herein constitutes presently preferred embodiments of the invention, it should be recognized that the invention can be varied in numerous ways without departing from the scope thereof. Accordingly, it should be understood that the invention should be limited only insofar as is required by the scope of the following claims.

What is claimed is:

1. A mobile telecommunications system comprising:
   an internet Protocol (IP) based Global System Mobile (GSM) system;
   a Universal Mobile Telephony System (UMTS) system;
   a connection connecting both said IP-based GSM system and said UMTS system to a common IP network; and
   wherein a user plane for both the GSM system and the UMTS system uses a common Media Gateway (MGW) and wherein said IP-based GSM system includes a Mobile Switching Center (MSC), at least one Base Station Controller (BSC) and at least one Radio Base Station (RBS), wherein said UMTS system includes at least one Radio Network Controller (RNC), and wherein a control plane of the MSC is terminated in an MSC server and a control plane of the RNC/BSC is terminated in a Radio Network Server (RN Server), and wherein the MSC server, the RN Server, the MGW and all RBSs are connected to the common IP network.

2. The system according to claim 1, wherein said connection comprises at least one IP-router.

3. The system according to claim 2, wherein:
   said IP-based GSM system includes a plurality of GSM system elements:
   said UMTS system includes a plurality of UMTS system elements; and
   wherein any of said plurality of GSM system elements and any of said plurality of UMTS system elements are capable of communicating with any other of said elements via said common IP-network.

4. The system according to claim 1, wherein the MSC server, the RN Server, the MGW and the RBS are all connected to said common IP network via at least one IP-router.

5. The system according to claim 1, wherein said MGW includes transcoders, an Interworking Unit, echo chancellors and DTMF senders.

6. The system according to claim 5, wherein said MGW is implemented as a distinct component.

7. The system according to claim 5, wherein said MGW is implemented in two separate network elements with an A-interface therebetween.

8. The system according to claim 1, wherein said system is incorporated in a mobile telecommunications network which comprises a plurality of said systems, end wherein each of said plurality of systems is connected via said common IP network.

9. The system according to claim 1, wherein said system further includes a connection to a PSTN and wherein said system is capable of carrying compressed speech from a mobile station associated with an RBS to the PSTN.

10. The system according to claim 1, wherein said system is capable of carrying compressed speech via an A-interface of said IP-based GSM system.

11. A mobile telecommunications network comprising:
    a plurality of switch sites, each of said plurality of switch sites including an Internet Protocol (IP) based Global System Mobile (GSM) system and a Universal Mobile Telephony System (UMTS) system, and a connector to a Public Switched Telephone Network (PSTN) wherein each said IP-based GSM system includes a plurality of GSM system elements and each said UMTS system includes a plurality of UMTS system elements;
    a common IP network connecting all of said plurality of sites wherein any of said plurality of GSM system elements and any of said plurality of UMTS system elements are capable of communicating with any other of said elements in said network via said common IP-network and wherein a user plane for each GSM system and each UMTS system is a common Media Gateway (MGW); and
    wherein the IP-based GSM system at each site includes a Mobile Switching Center MSC), at least one Base Station Controller (BSC) and at least one Radio Base Station (RBS), wherein the UMTS system at each site includes at least one Radio Network Controller (RNC), and wherein a control plane of the MSC is terminated in an MSC server, and a control plane of the RNC/BSC is terminated in a Radio Network Server (RN Server), and wherein the MSC server, the RN Server, the MGW and all RBSs are connected to the common IP network.

12. The network according to claim 11, wherein each of said plurality of sites further includes at least one IP-router connecting the plurality of sites to said common IP network.

13. The network according to claim 11 wherein each of said IP-based GSM system and UMTS system is capable of carrying compressed speech via an A-interface of said IP-based GSM system or an Iu interface of said UMTS system.

* * * * *